United States Patent
Crews

(10) Patent No.: US 6,617,285 B2
(45) Date of Patent: Sep. 9, 2003

(54) POLYOLS FOR BREAKING OF BORATE CROSSLINKED FRACTURING FLUID

(75) Inventor: James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/900,343

(22) Filed: Jul. 3, 2001

(65) Prior Publication Data
US 2003/0022796 A1 Jan. 30, 2003

(51) Int. Cl.[7] .............................. C09K 3/00; E21B 43/26
(52) U.S. Cl. ...................... 507/201; 507/273; 507/209; 507/211; 507/266; 507/903; 507/921; 507/922; 166/308
(58) Field of Search ................................ 507/273, 209, 507/211, 266, 903, 921, 922, 201; 166/308

(56) References Cited

U.S. PATENT DOCUMENTS

| | | |
|---|---|---|
| 3,079,332 A | 2/1963 | Wyant |
| 3,215,634 A | 11/1965 | Walker |
| 3,346,556 A | 10/1967 | Foster |
| 3,800,372 A | 4/1974 | Friedman |
| 4,619,776 A | 10/1986 | Mondshine |
| 5,067,566 A | 11/1991 | Dawson |
| 5,082,579 A | 1/1992 | Dawson |
| 5,106,518 A | 4/1992 | Cooney et al. |
| 5,145,590 A | 9/1992 | Dawson |
| 5,160,445 A | 11/1992 | Sharif |
| 5,160,643 A | 11/1992 | Dawson |
| 5,247,995 A * | 9/1993 | Tjon-Joe-Pin ............... 507/921 |
| 5,310,489 A | 5/1994 | Sharif |
| 5,372,732 A | 12/1994 | Harris et al. |
| 5,460,226 A | 10/1995 | Lawson et al. |
| 5,658,861 A | 8/1997 | Nelson et al. |
| 5,827,804 A * | 10/1998 | Harris et al. ................. 507/273 |
| 5,877,127 A | 3/1999 | Card et al. |
| 6,060,436 A | 5/2000 | Snyder et al. |
| 6,177,385 B1 | 1/2001 | Nimerick |

OTHER PUBLICATIONS

H. Deuel, et al., "Reaction of Boric Acid with Polysaccharides;" Nature, vol. 161, No. 4081, Jan. 17, 1948, pp. 96–97.
Derwent/WPI Abstract 1976–73139X/197639 to JP 51092508.
British Search Report for British Application No. GB 0215231.2, Oct. 21, 2002.

* cited by examiner

Primary Examiner—Philip Tucker
(74) Attorney, Agent, or Firm—Madan, Mossman & Sriram, P.C.

(57) ABSTRACT

It has been discovered that borate crosslinked fracturing fluid breaker mechanisms are improved by the inclusion of a polyol together with an enzyme. In fact, synergistic results may be achieved when both are used together as contrasted to the cases where each are used separately. Removing the borate ion from the crosslinked polymer reduces the pH of the fluid and in turn increases the activity of the enzyme. That is, once the pH is lowered, viscosity reduction (breaking) occurs by uncrosslinking of the polymer within the fracturing fluid, and by initiating or increasing activity of an enzyme breaker, if present. In one embodiment, the polyol has at least two cis-hydroxyl groups. In another embodiment, the polyols are monosaccharides such as glycerols and sugar alcohols, and may include mannitol, sorbitol, glucose, fructose, galactose, mannose, allose, etc. and mixtures thereof. Oligosaccharides and derivatives of monosaccharides and oligosaccharides are also useful.

24 Claims, 3 Drawing Sheets

POLYOLS FOR BREAKING OF BORATE CROSSLINKED FRACTURING FLUID

FIELD OF THE INVENTION

The present invention relates to gelled treatment fluids used during hydrocarbon recovery operations, and more particularly relates, in one embodiment, to methods of "breaking" or reducing the viscosity of treatment fluids containing gelling agents used during hydrocarbon recovery operations.

BACKGROUND OF THE INVENTION

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous based liquids that have either been gelled or foamed. When the fluids are gelled, typically a polymeric gelling agent, such as a solvatable polysaccharide is used. The thickened or gelled fluid helps keep the proppants within the fluid. Gelling can be accomplished or improved by the use of crosslinking agents or crosslinkers that promote crosslinking of the polymers together, thereby increasing the viscosity of the fluid.

The recovery of fracturing fluids may be accomplished by reducing the viscosity of the fluid to a low value so that it may flow naturally from the formation under the influence of formation fluids. Crosslinked gels generally require viscosity breakers to be injected to reduce the viscosity or "break" the gel. Enzymes, oxidizers, and acids are known polymer viscosity breakers. Enzymes are effective within a pH range, typically a 2.0 to 10.0 range, with increasing activity as the pH is lowered towards neutral from a pH of 10.0. Most conventional borate crosslinked fracturing fluids and breakers are designed from a fixed high crosslinked fluid pH value at ambient temperature and/or reservoir temperature. Optimizing the pH for a borate crosslinked gel is important to achieve proper crosslink stability and controlled enzyme breaker activity.

It would be desirable if a viscosity breaking system could be devised to break fracturing fluids gelled with borate crosslinked polymers by reducing the alkaline pH enough to both break the crosslinked gel viscosity and to increase the enzyme breaker activity, if enzymes are present.

SUMMARY OF THE INVENTION

Accordingly, it is an object of the present invention to provide a method for breaking the viscosity of aqueous treatment fluids gelled with borate crosslinked polymers used in hydrocarbon recovery operations.

It is another object of the present invention to provide a composition and method for breaking borate crosslinked aqueous fluids by lowering the pH of the alkaline fluid to make better use of an enzyme viscosity breaker.

Still another object of the invention is to provide a method and composition for breaking the viscosity of aqueous fluids gelled with borate crosslinked polymers that can provide better clean up of the crosslinked polymer.

In carrying out these and other objects of the invention, there is provided, in one form, a method for breaking viscosity of aqueous fluids gelled with borate crosslinked materials involving adding to an aqueous fluid gelled with at least one borate crosslinked polymer at least one polyol, in an amount effective to eventually reduce the pH of the fluid and remove at least a portion of borate ion from the crosslinked polymer; adding at least one enzyme to the aqueous fluid; and removing at least a portion of borate ion from the crosslinked polymer, reducing the pH of the fluid, and increasing the activity of the enzyme by reducing the pH.

DETAILED DESCRIPTION OF THE INVENTION

Figure 1:
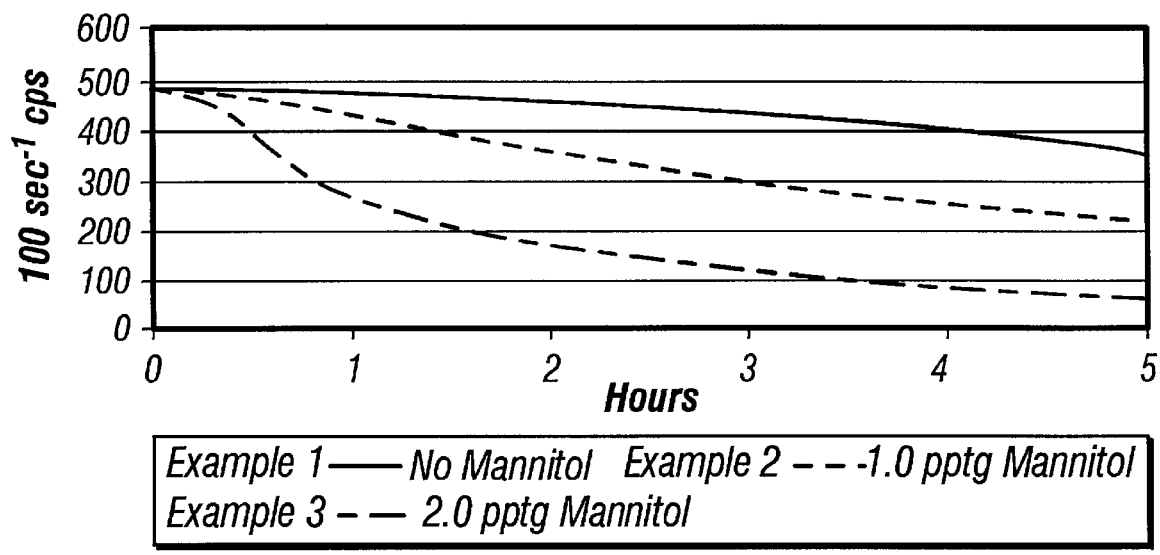
FIG. 1 is a graph of the effects of mannitol on ND30FW at 175° F. (79° C.)

A unique borate crosslinked fracturing fluid breaker mechanism in which the fracturing fluid's viscosity is reduced (or is "broken") by use of polyols has been discovered. These polyols are defined in one non-limiting embodiment as polyols having at least two cis-hydroxyl groups. In another embodiment of the invention, the polyols are monosaccharides, which are glycerols (trihydric monosaccharides having three hydroxyl groups) and sugar alcohols (having more than three hydroxyl groups) and oligosaccharides. In another embodiment of the invention, the polyols may have one of the following two formulae:

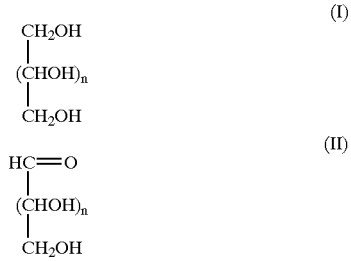

where n is from 2 to 5. In another embodiment of the invention, the polyols are acids, acid salts, fatty acids (alkyl glycosides), and alcohol, alkyl and amine derivatives (glycosylamines) of monosaccharides and oligosaccharides. Specific examples of polyols falling within these definitions include, but are not necessarily limited to, mannitol (manna sugar, mannite), sorbitol (D-sorbite, hexahydric alcohol), glycerol, glucose, (dextrose, grape sugar, corn sugar), fructose (fruit sugar, levulose), tagatose, psicose, galactose, xylose (wood sugar), allose (β-D-allopyranose), ribose, arabinose, rhamnose, mannose, altrose, ribopyranose, arabinopyranose, glucopyranose, gulopyranose, galatopyranose, psicopyranose, allofuranose, gulofuranose, galatofuranose, glucosamine, chondrosamine, galactosamine, ethyl-hexo glucoside, methyl-hexo glucoside, aldaric acid, sodium aldarate, glucaric acid, sodium glucarate, gluconic acid, sodium gluconate, glucoheptonic acid, sodium glucoheptonate, and mixtures thereof.

The use of simple sugars, acid sugars, acid sugar salts, alcohol sugars, alkyl glycosides, and glycosylamines to complex or chelate borate ions of the gelled polysaccharides lowers the pH of the borate crosslinked fluid and thus its viscosity. The lowering of the fluid's pH will also allow enzyme breaker activity to increase for faster fracturing fluid breaks. In fact, it has been surprisingly discovered that the use of the polyols together with enzymes gives synergistically better results than when a polyol or an enzyme are used separately or than would be expected if the effects of these components were merely added separately.

The use of the chemical technology of this invention will allow enzymes to work at a faster rate over time. It will allow the use of lower amounts of enzyme to break the fluid, resulting in cost savings to the well operator. It will also permit the use of enzyme breakers at lower reservoir temperatures in the borate crosslinked fluids as compared with what has been the practice or ability of oilfield service companies up to this time for borate crosslinked fluids.

While some polyols have been used previously to delay the gellation of fracturing fluids, it is believed that the use of these polyols to break the gel of the fracturing fluid by controlling the type and amount of polyol, particularly when used in conjunction with enzymes, is novel. The method of the invention involves controlled gel breaking, and can be achieved by using the polyol alone, or together with an enzyme breaker. In the embodiment where the enzyme is also used, the method and composition of the invention differ from that used previously by the mechanism employed to lower the borate-crosslinked fracturing fluid's pH to activate and/or accelerate the enzyme's breaking activity on the gel. Further, the amounts of polyols used in the method of this invention are lower than those used in the prior art where some of such polyols are used to delay gelling in the first place. In non-limiting embodiments, the amounts of polyols used in the methods of this invention may be up to one-twentieth (1/20) as low as what has been previously used. Further, the use of the polyols of this invention permit the breaking of gels over a wider temperature range than is possible with some prior art methods. The polyols of this invention may be used with enzymes up to about 225° F. (107° C.).

Once the pH starts to be lowered through the prescribed mechanism of liberating the borate ions from the gel by the polyols, breaking (viscosity reduction) occurs by: 1) uncrosslinking of the fracturing fluid; and by 2) an enzyme breaker designed to have a modified activity or higher activity as the pH is lowered. In general, the lower that the pH shifts through the use of a borate ion sequestering product, the more effective and complete the above-listed breaking mechanisms can be. In other words, because more than one mechanism is used, a more complete break may be obtained. Complete borate uncrosslinking and 100 percent enzyme activity can be achieved with the selection and proper use of a sequestering polyol.

It will be appreciated that breaking of the gel by reducing the pH of the fluid and removing at least a portion of the borate ion from the crosslinked polyol does not happen instantaneously or when the polyol is added to the fluid, nor should it. Rather, these mechanisms act over time or eventually. This time delay is necessary to complete the fracturing portion of the operation and the optional setting of the proppant. The time delay will also vary depending on the particular requirements of each individual fracturing job and cannot be specified in advance.

A value of the invention is that a fracturing fluid can be designed to have enhanced breaking characteristics. Importantly, better clean-up of the crosslinked polymer from the fracture and wellbore can be achieved thereby. Better clean-up of the crosslinked polymer directly influences the success of the fracture treatment, which is an enhancement of the well's hydrocarbon productivity.

Most conventional borate crosslinked fracturing fluids and breakers are designed from a fixed crosslinked fluid pH value at ambient and/or reservoir temperature. By having products that can lower the pH of the fracturing fluid at reservoir temperature, such as the materials of the invention, the breaking of the fluid can be enhanced beyond existing conventional materials or methods for fracturing. Uncrosslinking of the gel, more effective use of the enzyme breaker, and higher enzyme concentration can be used. The result is more enhanced breaking of the fracturing fluid over conventional materials and methods, which gives better clean-up of the crosslinked polymer from the fracture and wellbore.

In order to practice the method of the invention, an aqueous fracturing fluid is first prepared by blending a hydratable polymer into an aqueous fluid. The aqueous fluid could be, for example, water, brine, aqueous based foams or water-alcohol mixtures. Any suitable mixing apparatus may be used for this procedure. In the case of batch mixing, the hydratable polymer and the aqueous fluid are blended for a period of time sufficient to form a hydrated solution. The hydratable polymer that is useful in the present invention can be any of the hydratable polysaccharides having galactose or mannose monosaccharide components and are familiar to those in the well service industry. These polysaccharides are capable of gelling in the presence of a crosslinking agent to form a gelled base fluid. For instance, suitable hydratable polysaccharides are the galactomannan gums, guars and derivatized guars. Specific examples are guar gum and guar gum derivatives. The preferred gelling agents are guar gum, hydroxypropyl guar and carboxymethyl hydroxypropyl guar. The most preferred hydratable polymers for the present invention are guar gum and carboxymethyl hydroxypropyl guar and hydroxypropyl guar.

The amount of polysaccharide included in the fracturing fluid is not particularly critical so long as the viscosity of the fluid is sufficiently high to keep the proppant particles suspended therein during the fluid injecting step. Thus, depending on the application, the hydratable polymer is added to the aqueous fluid in concentrations ranging from about 15 to 60 pounds per thousand gallons (pptg) by volume of the total aqueous fluid (1.8 to 7.2 kg/m$^3$). The most preferred range for the present invention is about 20 to about 40 pptg (2.4 to 4.8 kg/m$^3$).

In addition to the hydratable polymer, the fracturing fluids of the invention include a borate crosslinking agent. The crosslinking agent can be any of the conventionally used borate crosslinking agents that are known to those skilled in the art. This includes any of the boron salts or boric acid as borate crosslinking agents. Guar and derivatized guar gels, which are crosslinked by the addition of borate ion donating materials are preferred within this embodiment over other crosslinking agents because they clean up faster and yield higher sand pack permeability than guar gels crosslinked with other crosslinking agents. However, other crosslinking agents can be used with this embodiment besides borate, which may include, but are not limited to, titanate, zirconate, and other metallic and semi-metallic high pH crosslinkers.

In the case of borate crosslinkers, the crosslinking agent is any material that supplies borate ions in solution. The amount of borate ions in solution is dependent on pH. Thus, the crosslinking agent can be any convenient source of borate ions, for instance the alkali metal and the alkaline earth metal borates and boric acid. A preferred crosslinking additive is preferably a common type of borax present in the range from about 0.25 to in excess of 10.0 pptg of the total aqueous fluid (0.03 to in excess of 1.2 lb/m$^3$). Preferably, the concentration of crosslinking agent is in the range from about 1.0 to about 3.0 pptg (0.12 to 0.34 kg/m$^3$) by volume of the total aqueous fluid.

Propping agents are typically added to the base fluid just prior to the addition of the crosslinking agent. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120–1700 kg/m$^3$) of fracturing fluid composition, but higher or lower concentrations can be used as the fracture design requires. The base fluid can also contain other conventional additives common to the well service industry such as surfactants, biocides, non-emulsifiers and the like.

In one non-limiting embodiment of the invention, the suitable polyol materials for use in the invention that are suitable include those described above, such as monosaccharides, oligosaccharides, and their acid, acid salt, alcohol, alkyl, and amine derivatives, in one non-limiting embodiment of the invention. In a different preferred embodiment, polyols of formulae (I) and (II), are preferred in another non-limiting embodiment of the invention.

Any or all of the above polyol materials may be provided in an extended release form such as encapsulation by polymer or otherwise, pelletization with binder compounds, absorbed on a porous substrate, and a combination thereof. Specifically, the materials may be encapsulated to permit slow or timed release of the polyol materials. In non-limiting examples, the coating material may slowly dissolve or be removed by any conventional mechanism, or the coating could have very small holes or perforations therein for the material within to diffuse through slowly. For instance, polymer encapsulation coatings such as used in fertilizer technology available from Scotts Company, specifically POLY-S® product coating technology, or polymer encapsulation coating technology from Fritz Industries could possibly be adapted to the methods of this invention.

It is difficult, if not impossible, to specify with accuracy the amount of the polyol that should be added to a particular aqueous fluid gelled with borate crosslinked polymers to fully break the gel, in general. For instance, a number of factors affect this proportion, including but not necessarily limited to, the particular polymer used to gel the fluid; the particular polyol used to break the gel; the temperature of the fluid; the starting pH of the fluid; whether an enzyme breaker is also used; the particular nature of the enzyme breaker, if present; the concentration of the enzyme; the nature and the concentration of the pH buffers; and the complex interaction of these various factors. Nevertheless, in order to give an approximate feel for the proportions of the polyol to be used in the method of the invention, the amount of material added may range from about 0.1 to about 30.0 pptg (about 0.012 to about 3.4 kg/m$^3$), based on the total weight of the fluid; preferably from about 0.5 to about 30.0 pptg (about 0.06 to about 3.4 kg/m$^3$) most preferably from about 1.0 to about 20.0 pptg (about 0.12 to about 2.4 kg/m$^3$).

In one preferred, non-limiting embodiment of the invention, an enzyme breaker is also present. In some embodiments, enzyme breakers are preferred because they are not themselves consumed in the breaking process. Suitable enzyme breakers include, but are not necessarily limited to, hemi-cellulases, such as galactosidase and mannosidase hydrolases; cellulases; pectinases; alpha-amylases, and even undefined enzyme breakers and mixtures thereof derived from bacterial extracts that function in the method of this invention, and mixtures thereof. Specific, but non-limiting examples of suitable enzymes include GAMMANASE 1.0L hemicellulase from Novo Nordisk, MULTIFECT GC cellulase from Genencor International, PECTINEX® ULTRA SPL pectinase from Novo Nordisk, SPEZYME FRED alpha-amylase from Biocat, Inc., and PLEXGEL 10L available from Chemplex. The particular enzyme breakers useful in the method of the invention may have an activity in the pH range from about 2 to about 11; preferably from about 5 to about 10, and are effective to attack the specific galactomannan linkages in the galactomannan-based crosslinked polymer gel. In the case where the borate crosslinked polymer is a guar or guar-based polymer, the enzyme may be effective to break 1,4-β-D-mannosidic linkages and/or the 1,6-α-D-glactomannosidic linkages.

Similarly to the proportions of the polyol, it is difficult, if not impossible, to predict in advance and with accuracy the amount of enzyme breaker to be used in general in the practice of the method of this invention. This is due to the numerous complex and interrelated factors mentioned previously. Nevertheless, in order to give an approximate feel for the proportions of the divalent cation-generating materials to be used in the method of the invention, the amount of enzyme breaker added may range from about 0.001 to about 5.0 gptg (about 0.0001% by volume to about 0.5% BV), based on the total volume of the entire fluid; preferably from about 0.01 to about 3.0 gptg (about 0.001% BV to about 0.3% BV). (These proportions may be expressed in identical values in SI units of liters per thousand liters.) Enzymes are generally expensive and if they are employed, it is desirable to minimize their proportion to only what is necessary.

It is necessary to add pH buffers to the gelled aqueous fluid to increase the pH to generate active borate ion for crosslinking the polymers. Suitable buffers include, but are not necessarily limited to sodium hydroxide, potassium hydroxide, sodium carbonate, sodium sesquicarbonate, potassium carbonate, sodium bicarbonate, sodium sesquicarbonate, and mixtures thereof. The amount of the pH buffer may range from about 0.5 to about 30.0 pptg (about 0.06 to about 3.6 kg/m$^3$), based on the total volume of the entire fluid, preferably from about 1 to about 20 pptg (about 0.12 to about 2.4 kg/m$^3$).

In a typical fracturing operation, the fracturing fluid of the invention is pumped at a rate sufficient to initiate and propagate a fracture in the formation and to place propping agents into the fracture. A typical fracturing treatment would be conducted by hydrating a 20 lb to 30 lb/1000 gal water (weight/volume) (about 2.4 to about 3.6 kg/m$^3$) glactomannan-based polymer, such as guar, in a 2% (w/v) (166 lb/1000 gal (19.9 kg/m$^3$)) KCl solution at a pH ranging from about 6.0 to about 8.0. For crosslinking this pH range may be from about 8.8 to about 10.5. The polyol is added at this stage. It should be understood throughout the specification and claims that more than one polyol may be employed at a time. During the actual pumping, as described, the pH of the ambient temperature guar gel is raised by the addition of a buffer to about 9.5 to about 12.5, followed by the addition of the enzyme breaker, crosslinking agent, proppant, and other additives, if required.

The present invention will be explained in further detail in the following non-limiting Examples that are only designed to additionally illustrate the invention but not narrow the scope thereof.

GENERAL PROCEDURE FOR EXAMPLES 1–11

Using a Waring blender, 4.8 mls of Drilling Specialties Slurry Guar (guar gum suspended in a mineral oil slurry) was hydrated for 15 minutes within 500 mls of distilled water containing 10 grams KCl salt. A polyol such as 0.12 g of mannitol was added to the hydrated guar fluid. Another sample of the guar polymer fluid was mixed without adding any polyol. Mixed samples were then placed into 500 ml wide mouth Nalgene plastic bottles. Sodium sesquicarbonate high pH buffer (e.g. BA-8 from FMC Corporation, 0.96 grams) was added to and allowed to dissolve in each 500 ml guar fluid to raise the pH of the fluids (took about 3 to 5 minutes of shaking the bottles). Next, 1.0 ml Spezyme FRED enzyme (from Bio-Cat Inc.) was quickly added followed by 0.875 mls XL-1L borate crosslinker (from Benchmark Research). Each sample was capped and shaken vigorously for 60 seconds. The samples were placed in a water bath at 175° F. (79° C.) and visually observed every 30 minutes for viscosity reduction difference between the samples. The samples with polyol (e.g. mannitol) lost viscosity noticeably faster. Most gel breaking occurred over the first two hours.

Examples 1–3

Examples 1–3 show the effects of using no enzyme breaker with various levels of mannitol. The general procedure was followed where the Drilling Specialties Slurry Guar polymer loading was 30 pptg (pounds per thousand gallons) (3.6 kg/m$^3$). The crosslinker was as noted in the general procedure. The temperature was 175° F. (790° C.).

The results are presented in FIG. 1. It may be observed that the system of Example 2 containing 1.0 pptg mannitol (0.12 kg/m$^3$) reduced the viscosity considerably and faster than the degradation for the control Example 1 containing no polyol viscosity breaker. As expected, the Example 3 system containing more mannitol (2.0 pptg (0.24 kg/m$^3$)) reduced the viscosity to lower levels and at a faster rate.

The term ND30FW in this and other Examples refers to a 30.0 lbs/1000 gallon non-delayed (ND) borate crosslinked fluid in 2% KCl fresh water (FW).

Examples 4–5

Examples 1, 4 and 5 show the effects of using no enzyme breaker with various levels of sorbitol. The general procedure was followed where the Drilling Specialties Slurry Guar polymer loading was 30 pptg (3.6 kg/m$^3$). The crosslinker was as noted in the general procedure. The temperature was 175° F. (79° C.).

Figure 2:
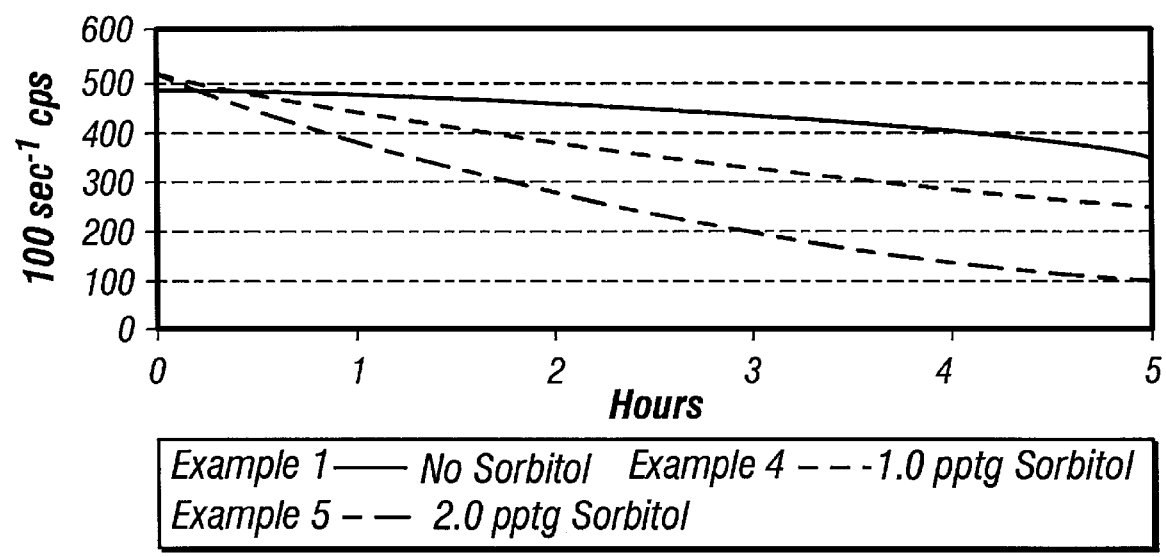
FIG. 2 is a graph of the effects of sorbitol on ND30FW at 175° F. (79° C.)

The results are given in FIG. 2. The graph for control Example 1 containing no sorbitol shows only the slow, unassisted viscosity degradation with time. Example 4 containing 1.0 pptg (0.12 kg/m$^3$) sorbitol demonstrated more rapid viscosity reduction. The Example 5 system containing 2.0 pptg (0.24 kg/m$^3$) sorbitol showed yet more rapid and greater viscosity reduction, as expected, beginning about 1 hour into the experiment.

Examples 6–7

Examples 6 and 7 show the effects of using the Spezyme FRED enzyme breaker (from Bio-Cat Inc.) with and without mannitol, one of the polyols of the invention. The general procedure was followed where the BoraFRAQ guar polymer loading was 30 pptg (3.6 kg/m$^3$). The crosslinker was as noted in the general procedure. The temperature was 175° F. (790° C.).

Figure 3:
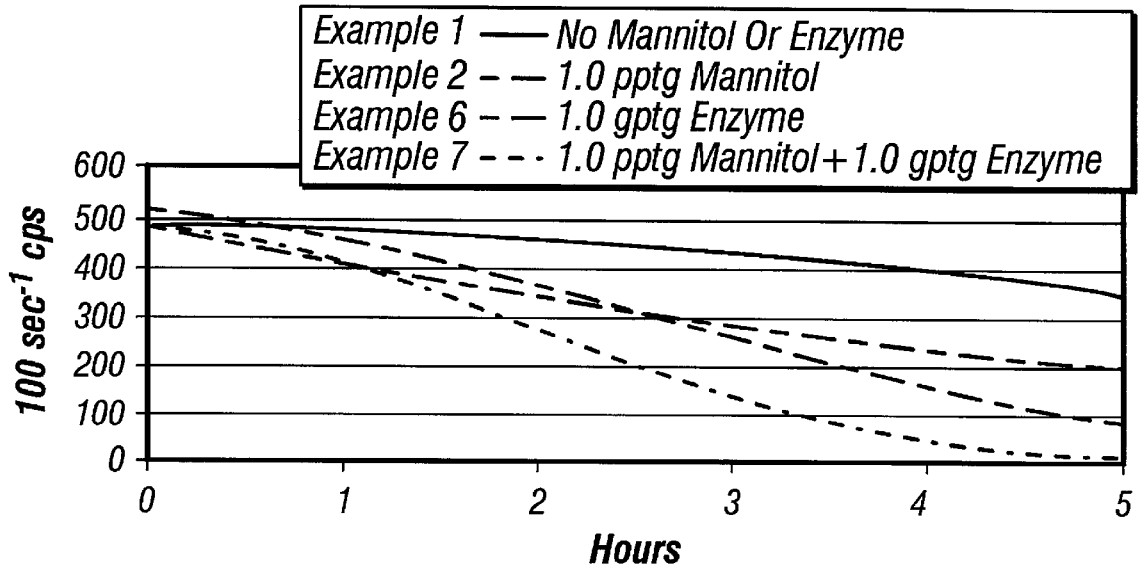
FIG. 3 is a graph of the effects an enzyme breaker Spezyme FRED with mannitol on ND30FW at 175° F. (79° C.)

The results are shown in FIG. 3. Again, comparative and control Example 1 used no enzyme or mannitol. Example 2 again employed only mannitol. Example 6 used 2.0 gptg of the "FRED" enzyme from Biocat but no mannitol, and the breaking rate was similar to that for Example 2 for about the first three hours, after which the gel broke faster and more completely as compared with Example 2. However, in the Example 7 system, which used 1.0 gptg of the FRED enzyme (as in Ex. 6) and 1.0 pptg (0.12 kg/m$^3$) mannitol (as in Ex. 2), the viscosity decrease was unexpectedly even more rapid and complete beginning at about 2 hours.

Example 8

Figure 4:
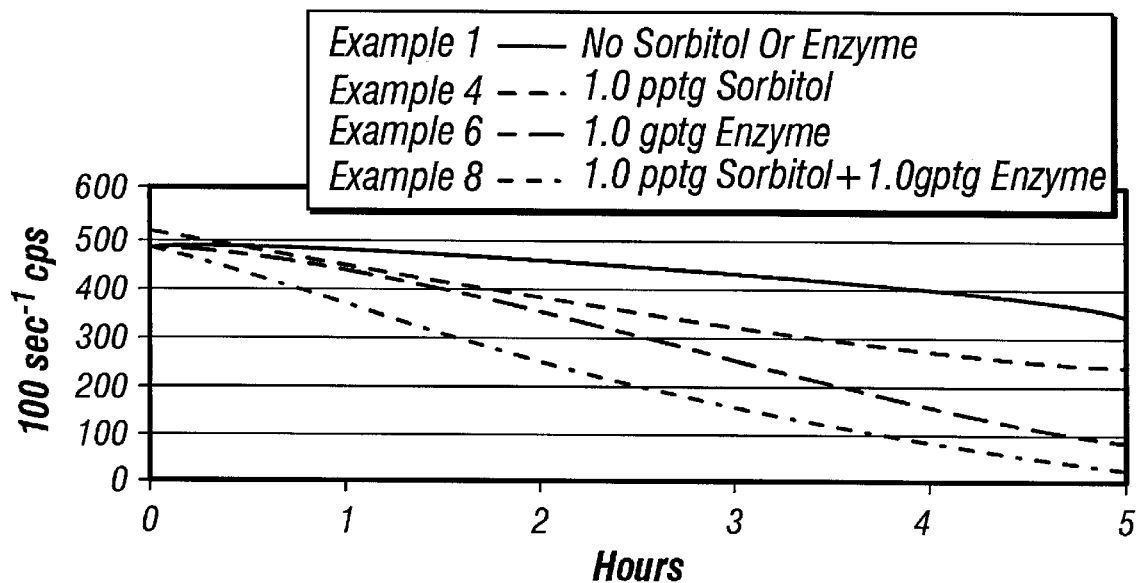
FIG. 4 is a graph of an enzyme breaker Spezyme FRED with sorbitol on ND30FW at 175° F. (79° C.)

FIG. 4 presents the curves for Examples 1, 4 and 6 again, along with the results for Example 8 where 1.0 pptg sorbitol (0.12 kg/m$^3$) was used as in Example 4 and 1.0 gptg of the Spezyme FRED enzyme breaker was used as in Example 6. The results shown in FIG. 4 indicated that unexpectedly sorbitol gives a more complete break of the gel even faster than with mannitol (Ex. 7). Note that the curve begins to decline noticeably after about 0.5 hour (Ex. 8).

Examples 9–11

Figure 5:
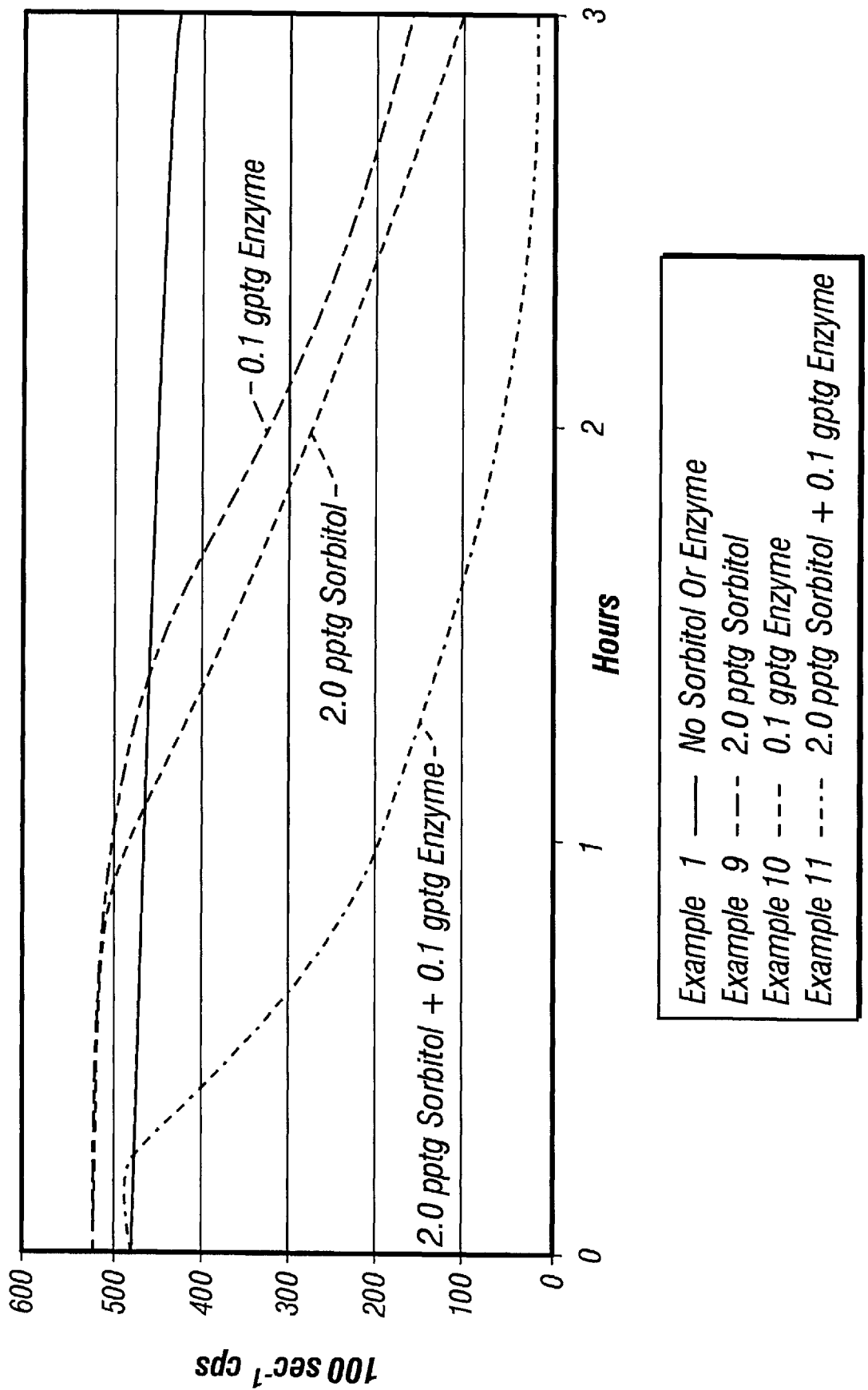
FIG. 5 is a graph of an enzyme breaker GAMMANASE 1.0L with sorbitol on ND30FW at 175° F. (79° C.).

Examples 9–11 show that using a polyol of the invention such as sorbitol permits the use of less enzyme breaker than normal to achieve the same results. The general procedure was followed as in Examples 1, 4, 6 and 8 of FIG. 4, except that 0.1 gptg of the enzyme was used in Examples 10 and 11 (one-tenth as much as in Examples 6 and 8), and 2.0 pptg sorbitol was used in Examples 9 and 11 (twice as much as in Examples 4 and 8). Additionally, the enzyme was GAMMANASE 1.0L, available from Novo Nordisk. As can be seen from FIG. 5, excellent results were obtained: unexpectedly rapid and complete breaking began at less than 0.5 hour into the experiment. It may be clearly seen that the results obtained in Example 11 were better than what could be expected from the mere addition of the results of Examples 9 and 10. It is clear that the invention gives surprising, synergistic results. It is anticipated that by using the polyols of the invention that the amount of expensive enzyme used on a fracturing job could be reduced by half or by one-third, if not more.

Example 12

Table I below presents a chart of the pH of the indicated system as a function of borate ion and sorbitol concentration demonstrating a steady decrease in pH with increasing sorbitol, as expected in the method of this invention. The pH measurements were made 1.0 hour after mixing the materials.

TABLE 1

Borate Ion Versus Sorbitol Concentration Versus pH

| Temp, °F. (°C.) | K$_2$CO$_3$ pH Buffer, pptg (kg/m$^3$) | Boric Acid pptg (kg/m$^3$) | Sorbitol, pptg (kg/m$^3$) | pH |
|---|---|---|---|---|
| 73 (23) | 2.9 (0.35) | 1.2 (0.14) | None | 9.61 |
| 73 (23) | 2.9 (0.35) | 1.2 (0.14) | 1.0 (0.12) | 9.49 |
| 73 (23) | 2.9 (0.35) | 1.2 (0.14) | 2.0 (0.24) | 9.39 |
| 73 (23) | 2.9 (0.35) | 1.2 (0.14) | 4.0 (4.8) | 9.12 |
| 73 (23) | 2.9 (0.35) | 1.2 (0.14) | 8.0 (0.96) | 8.66 |

The Examples herein clearly demonstrate the efficacy of the method of the invention.

In the foregoing specification, the invention has been described with reference to specific embodiments thereof, and has been demonstrated as effective in providing a method and composition for a borate crosslinked fracturing fluid breaker mechanism. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations or amounts of polymers, crosslinkers, buffers, polyols, and other components falling within the claimed parameters, but not specifically identified or tried in a particular composition, are anticipated and expected to be within the scope of this invention.

I claim:

1. A method for breaking viscosity of aqueous fluids gelled with borate crosslinked materials comprising:
   adding to an aqueous fluid gelled with at least one borate crosslinked polymer at least one polyol, in an amount effective to eventually reduce the pH of the fluid and remove at least a portion of borate ion from the crosslinked polymer;
   adding at least one enzyme to the aqueous fluid; and
   removing at least a portion of borate ion from the crosslinked polymer, reducing the pH of the fluid, and increasing the activity of the enzyme by reducing the pH.

2. The method of claim 1 where in adding the polyol the polyol has at least two cis-hydroxyl groups.

3. The method of claim 2 where in adding the polyol, the polyol is selected from the group consisting of monosaccharides, oligosaccharides, and acid, acid salt, alcohol, alkyl and amine derivatives thereof.

4. The method of claim 2 where in adding the polyol, the polyol is selected from the group consisting of mannitol, sorbitol, glycerol, glucose, fructose, tagatose, psicose, galactose, xylose, allose, ribose, arabinose, rhamnose, mannose, altrose, ribopyranose, arabinopyranose, glucopyranose, gulopyranose, galatopyranose, psicopyranose, allofuranose, gulofuranose, galatofuranose, glucosamine, chondrosamine, galactosamine, ethyl-hexo glucoside, methyl-hexo glucoside, aldaric acid, sodium aldarate, glucaric acid, sodium glucarate, gluconic acid, sodium gluconate, glucoheptonic acid, sodium glucoheptonate, and mixtures thereof.

5. The method of claim 1 where in adding the polyol, more than one polyol is added.

6. The method of claim 1 where in adding the polyol, the amount of polyol added ranges from about 0.1 to about 30.0 pptg (about 0.012 to about 3.4 kg/m$^3$) based on the total volume of fluid.

7. The method of claim 1 where in adding the enzyme, the enzyme is selected from the group consisting of hemi-cellulases, cellulases, pectinases, and alpha-amylases.

8. The method of claim 7 where in adding the enzyme, the amount of enzyme added ranges from about 0.001 to about 5.0 gptg based on the total volume of fluid.

9. The method of claim 7 where the borate crosslinked polymer is a guar or guar-based polymer and the enzyme is effective to break linkages selected from the group consisting of 1,4-β-D-mannosidic linkages; 1,6-α-D-glactomannosidic linkages; and mixtures thereof at a pH in the range of from about 2 to about 11.

10. An aqueous fluid comprising
    at least one borate crosslinked polymer;
    at least one polyol, in an amount effective to eventually reduce the pH of the fluid and remove at least a portion of borate ion from the crosslinked polymer;
    at least one enzyme; and
    water
    where the effective amount of polyol ranges from about 0.1 to 8.0 pptg (about 0.012 to 0.96 kg/m$^3$) based on the total volume of fluid.

11. The fluid of claim 10 where the polyol has at least two cis-hydroxyl groups.

12. The fluid of claim 10 where the polyol is selected from the group consisting of monosaccharides, oligosaccharides, and acid, acid salt, alcohol, alkyl and amine derivatives thereof.

13. The fluid of claim 10 where the polyol is selected from the group consisting of mannitol, sorbitol, glycerol, glucose, fructose, tagatose, psicose, galactose, xylose, allose, ribose, arabinose, rhamnose, mannose, altrose, ribopyranose, arabinopyranose, glucopyranose, gulopyranose, galatopyranose, psicopyranose, allofuranose, gulofuranose, galatofuranose, glucosamine, chondrosamine, galactosamine, ethyl-hexo glucoside, methyl-hexo glucoside, aldaric acid, sodium aldarate, glucaric acid, sodium glucarate, gluconic acid, sodium gluconate, glucoheptonic acid, sodium glucoheptonate, and mixtures thereof.

14. The fluid of claim 10 where more than one polyol is present.

15. The fluid of claim 10 where the enzyme is selected from the group consisting of hemi-cellulases, cellulases, pectinases, and alpha-amylases.

16. The fluid of claim 15 where the amount of enzyme ranges from about 0.001 to about 5.0 gptg based on the total volume of fluid.

17. The fluid of claim 15 where the borate crosslinked polymer is a guar or guar-based polymer and the enzyme is effective to break linkages selected from the group consisting of 1,4-β-D-mannosidic linkages; 1,6-α-D-glactomannosidic linkages; and mixtures thereof at a pH in the range of from about 2 to about 11.

18. An aqueous fluid comprising
    at least one borate crosslinked polymer;
    at least one polyol, in an amount effective to eventually reduce the pH of the fluid and remove at least a portion of borate ion from the crosslinked polymer, where the polyol has at least two cis-hydroxyl groups and where the amount of the polyol ranges from about 0.1 to 8.0 pptg (about 0.012 to 0.96 kg/m$^3$) based on the total volume of fluid;
    at least one enzyme; and
    water.

19. The fluid of claim 18, where the polyol is selected from the group consisting of monosaccharides, oligosaccharides, and acid, acid salt, alcohol, alkyl and amine derivatives thereof.

20. The fluid of claim 18 where the polyol is selected from the group consisting of mannitol, sorbitol, glycerol, glucose, fructose, tagatose, psicose, galactose, xylose, allose, ribose, arabinose, rhamnose, mannose, altrose, ribopyranose, arabinopyranose, glucopyranose, gulopyranose, galatopyranose, psicopyranose, allofuranose, gulofuranose, galatofuranose, glucosamine, chondrosamine, galactosamine, ethyl-hexo glucoside, methyl-hexo glucoside, aldaric acid, sodium aldarate, glucaric acid, sodium glucarate, gluconic acid, sodium gluconate, glucoheptonic acid, sodium glucoheptonate, and mixtures thereof.

21. The fluid of claim 18 where more than one polyol is present.

22. The fluid of claim 18 where the enzyme is selected from the group consisting of hemi-cellulases, cellulases, pectinases, and alpha-amylases.

23. The fluid of claim 18 where the amount of enzyme ranges from about 0.001 to about 5.0 gptg based on the total volume of fluid.

24. The fluid of claim 18 where the borate crosslinked polymer is a guar or guar-based polymer and the enzyme is effective to break linkages selected from the group consisting of 1,4-$\beta$-D-mannosidic linkages; 1,6-$\alpha$-D-glactomannosidic linkages; and mixtures thereof at a pH in the range of from about 2 to about 11.

* * * * *

UNITED STATES PATENT AND TRADEMARK OFFICE
CERTIFICATE OF CORRECTION

PATENT NO. : 6,617,285 B2  Page 1 of 1
DATED : September 9, 2003
INVENTOR(S) : James B. Crews It is certified that error appears in the above-identified patent and that said Letters Patent is hereby corrected as shown below:

Column 7,
Line 45, please delete "790º C" and insert therefor -- 79º C --.

Column 8,
Line 15, please delete "790º C" and insert therefor -- 79º C --.

Signed and Sealed this

Thirteenth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,617,285 B2
DATED : September 9, 2003
INVENTOR(S) : James B. Crews It is certified that error appears in the above-identified patent and that said Letters Patent is hereby corrected as shown below:

Column 6,
Lines 38-39, please delete [divalent cation-generating materials] and insert -- enzyme breaker --.

Signed and Sealed this

Twenty-fourth Day of August, 2004

JON W. DUDAS
*Director of the United States Patent and Trademark Office*